United States Patent
Agrawal et al.

(10) Patent No.: US 11,455,592 B2
(45) Date of Patent: Sep. 27, 2022

(54) SYSTEMS AND METHODS FOR FACILITATING INTERACTIVE SCENARIOS BASED ON USER PARAMETERS

(71) Applicant: MASTERCARD INTERNATIONAL INCORPORATED, Purchase, NY (US)

(72) Inventors: Uthra Agrawal, St. Charles, MO (US); Shunmuga Sundaram Mohankumar, O'Fallon, MO (US); Smita Sebastian, St. Louis, MO (US); Gautam Uppalapati, O'Fallon, MO (US); Steve Podgorski, Defiance, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 697 days.

(21) Appl. No.: 15/618,053

(22) Filed: Jun. 8, 2017

(65) Prior Publication Data

US 2018/0357592 A1    Dec. 13, 2018

(51) Int. Cl.
| | |
|---|---|
| *G06Q 10/08* | (2012.01) |
| *G06Q 30/02* | (2012.01) |
| *G06Q 30/06* | (2012.01) |

(52) U.S. Cl.
CPC .......... *G06Q 10/083* (2013.01); *G06Q 30/02* (2013.01); *G06Q 30/0209* (2013.01); *G06Q 30/06* (2013.01); *G06Q 30/0641* (2013.01)

(58) Field of Classification Search
CPC .. G06Q 10/083; G06Q 30/02; G06Q 30/0209; G06Q 30/06; G06Q 30/0641

(Continued)

(56) References Cited

U.S. PATENT DOCUMENTS

| 8,478,661 B1 | 7/2013 | Kressler |
| 9,104,237 B1 | 8/2015 | Glass et al. |

(Continued)

OTHER PUBLICATIONS

Revisions to the Requirements for Authority to Manufacture and Distribute Postage Evidencing Systems; Customized Postage Products. vol. 82. Washington: Federal Information & News Dispatch, LLC, 2017. Print. (Year: 2017).*

*Primary Examiner* — Akiba K Robinson
(74) *Attorney, Agent, or Firm* — Harness, Dickey & Pierce, P.L.C.

(57) ABSTRACT

Systems and methods are provided for facilitating interactive delivery of a product to a recipient, through compiled delivery scenarios. One exemplary method includes soliciting a parameter (or parameters) associated with a product subject to purchase by a consumer, and transmitting an invitation to an interactive delivery of the product to a recipient. The method also includes compiling a scenario for the interactive delivery of the product based on the parameter(s) and, in response to acceptance of the invitation, transmitting the scenario to a communication device associated with the recipient. The method further includes appending a product insignia to the scenario in response to the communication device traveling to at least one intermediate location of the scenario, and transmitting a confirmation for the product when the communication device travels to a delivery location associated with the product insignia, whereby the recipient is permitted to receive the product based on the confirmation.

19 Claims, 14 Drawing Sheets

(58) Field of Classification Search
USPC ........ 705/7.11, 1.1, 330, 332, 333, 337, 338
See application file for complete search history.

(56) References Cited

U.S. PATENT DOCUMENTS

| | | | |
|---|---|---|---|
| 10,602,052 B2* | 3/2020 | Eronen | H04N 5/2258 |
| 2007/0282697 A1* | 12/2007 | Kirby | G06Q 30/0277 |
| | | | 705/14.73 |
| 2011/0173101 A1* | 7/2011 | Gerntholtz | G06Q 30/0643 |
| | | | 705/27.2 |
| 2014/0058873 A1 | 2/2014 | Sorensen et al. | |
| 2014/0074704 A1 | 3/2014 | White et al. | |
| 2016/0091350 A1* | 3/2016 | Kadaba | G07C 5/008 |
| | | | 73/865.8 |
| 2016/0104113 A1* | 4/2016 | Gorlin | G06Q 10/08355 |
| | | | 705/338 |
| 2017/0084082 A1* | 3/2017 | McTaggart | H04L 67/18 |
| 2017/0123496 A1* | 5/2017 | Wang | G06F 3/011 |
| 2018/0129221 A1* | 5/2018 | Mandeville-Clarke | |
| | | | G08G 1/202 |
| 2019/0122172 A1* | 4/2019 | Gil | B64D 45/04 |

* cited by examiner

SYSTEMS AND METHODS FOR FACILITATING INTERACTIVE SCENARIOS BASED ON USER PARAMETERS

FIELD

The present disclosure generally relates to systems and methods for facilitating interactive scenarios based on data transactions, and in particular, to systems and methods for compiling such interactive scenarios for users based on parameters provided by the users and/or recipient users, and then providing the interactive scenarios to the recipient users.

BACKGROUND

This section provides background information related to the present disclosure which is not necessarily prior art.

Consumers are known to use payment accounts to fund transactions for products (e.g., goods and services, etc.) from merchants. In general, at the point of purchase of a product, and after the transaction for the product is approved, the consumer takes possession of the product, or directs its delivery to a location associated with the consumer, or another person (e.g., as a gift to the person, etc.). When delivery of the product is required, the merchant coordinates with a carrier for the delivery of the product to the desired location. Additionally, the consumer may opt, at purchase, to pick up the product at a particular merchant location.

DRAWINGS

The drawings described herein are for illustrative purposes only of selected embodiments and not all possible implementations, and are not intended to limit the scope of the present disclosure.

Figure 1:
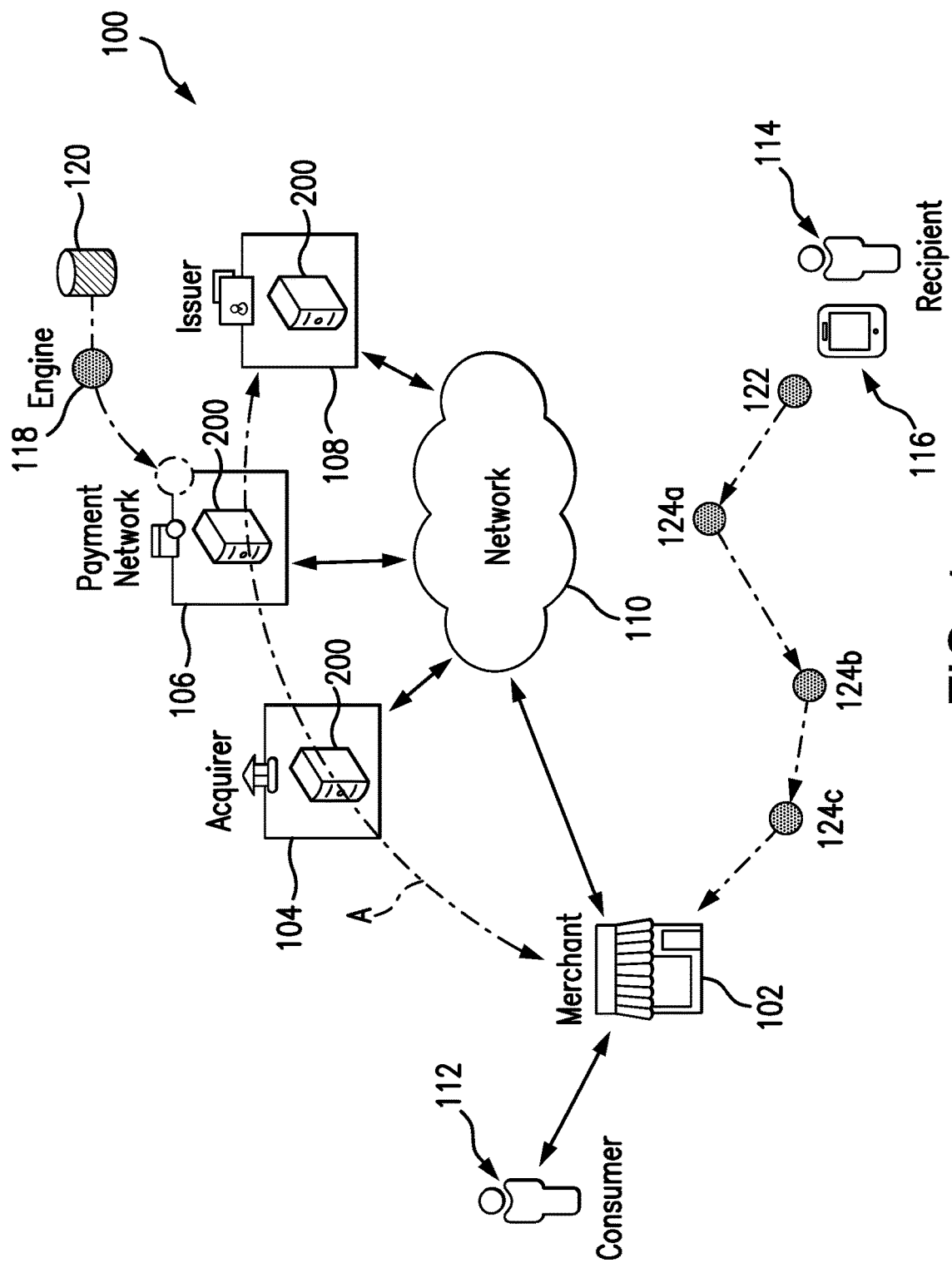
FIG. 1 is a block diagram of an exemplary system of the present disclosure suitable for use in facilitating interactive delivery of products to recipients, through one or more compiled scenarios.
Figure 3:
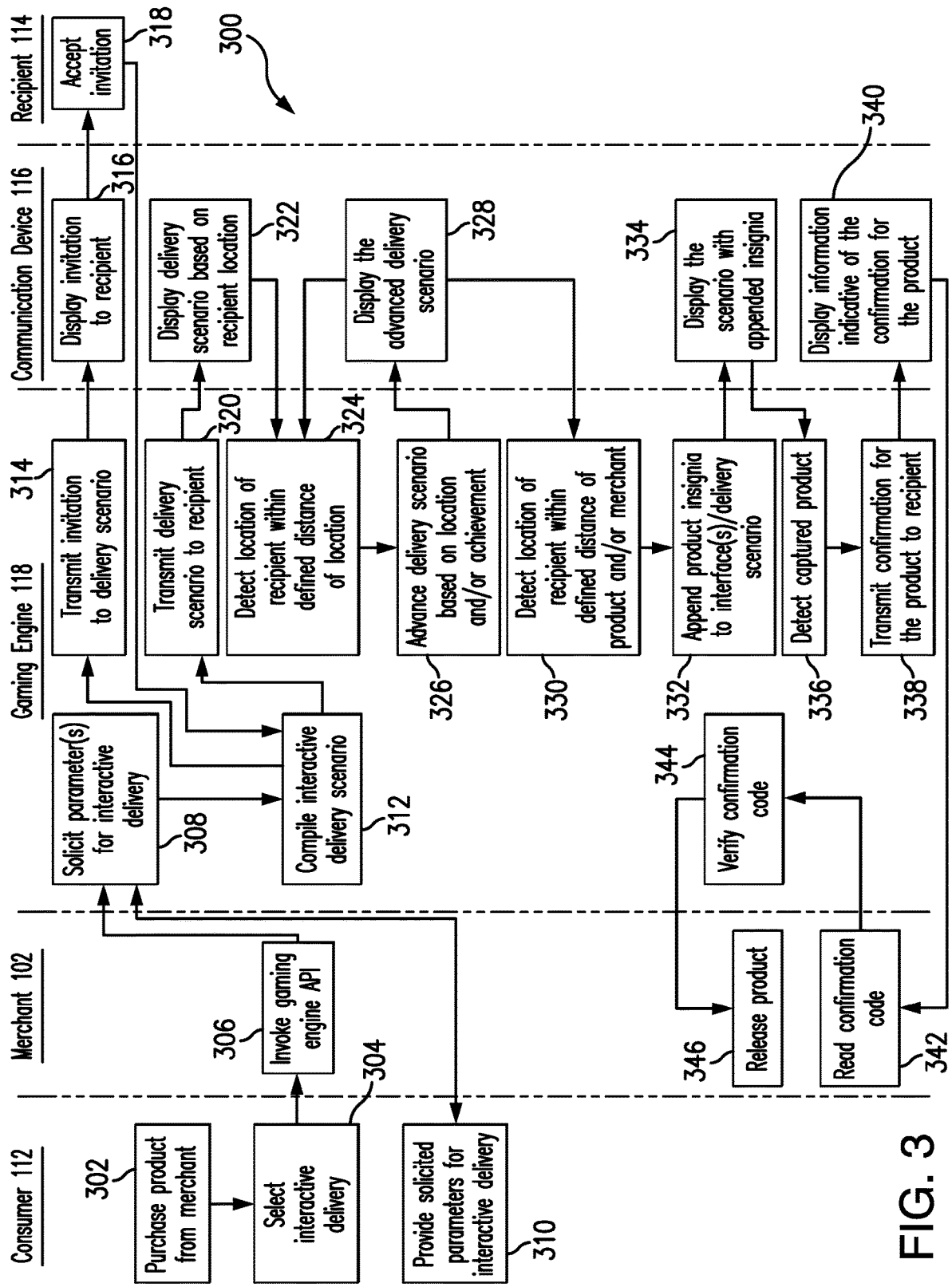
FIG. 3 is a flow diagram of an exemplary method, which may be implemented in connection with the system of FIG. 1, for facilitating interactive delivery of a product to a recipient, through one or more compiled scenarios.
Figure 4:
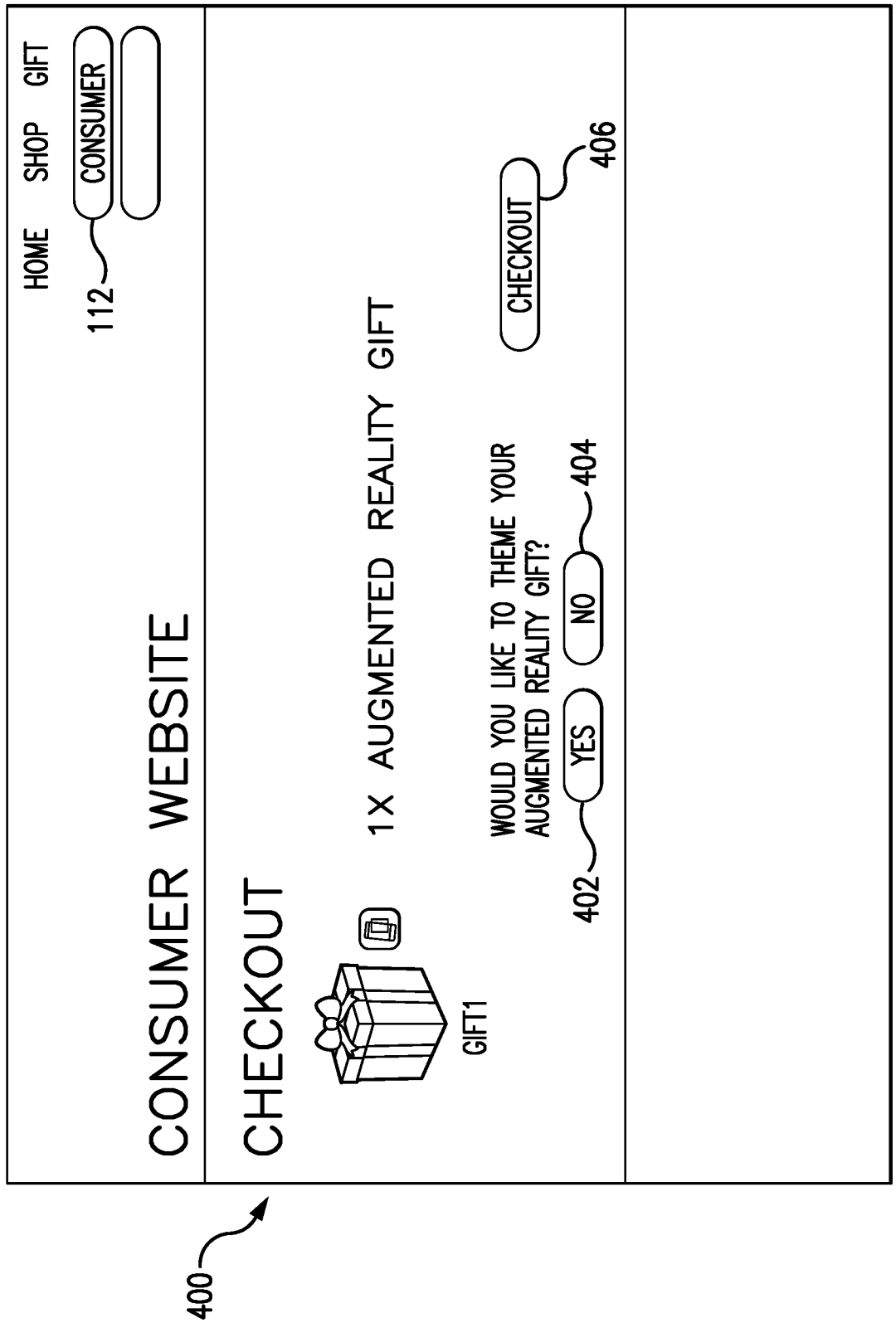
Figure 5:
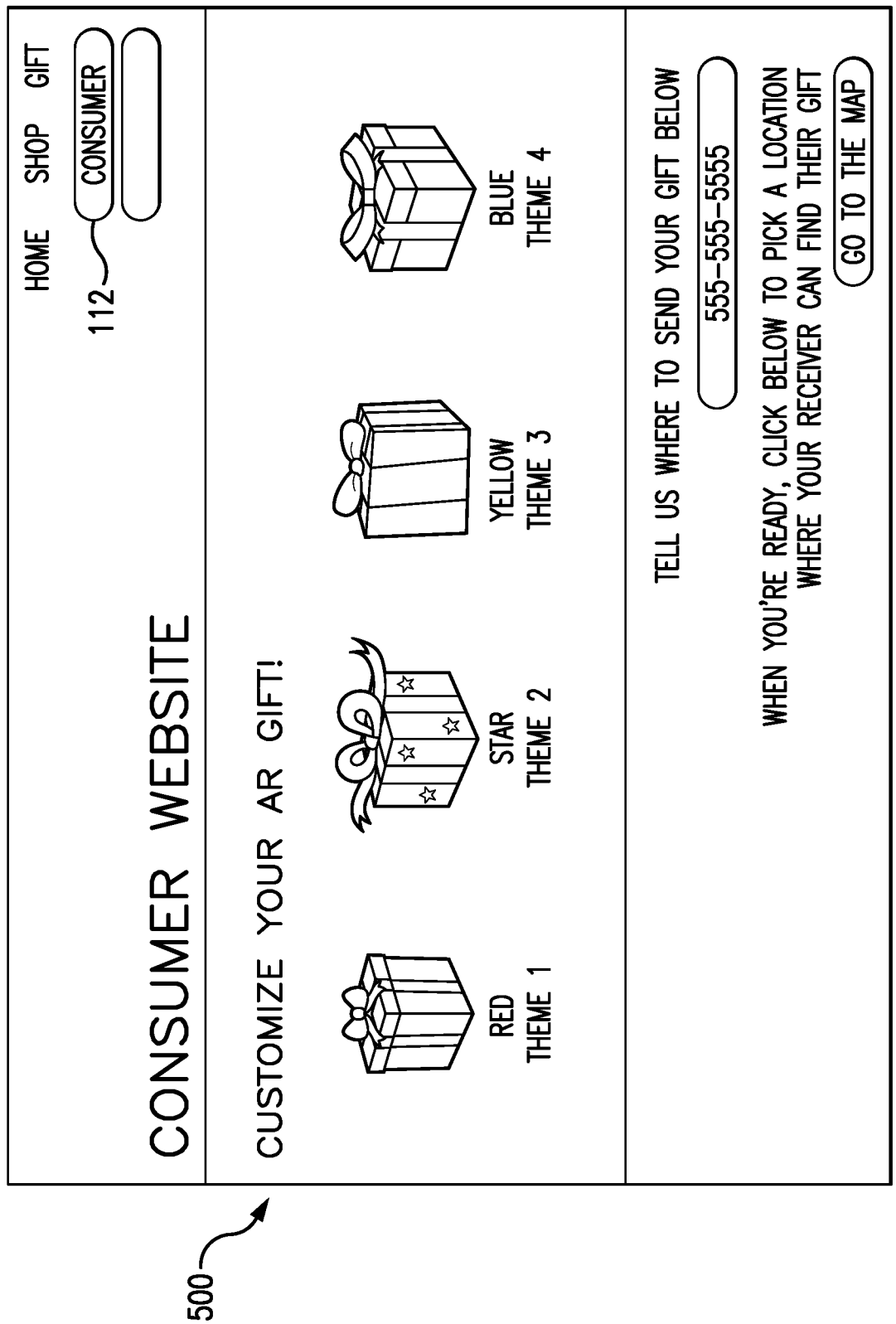
Figure 6:
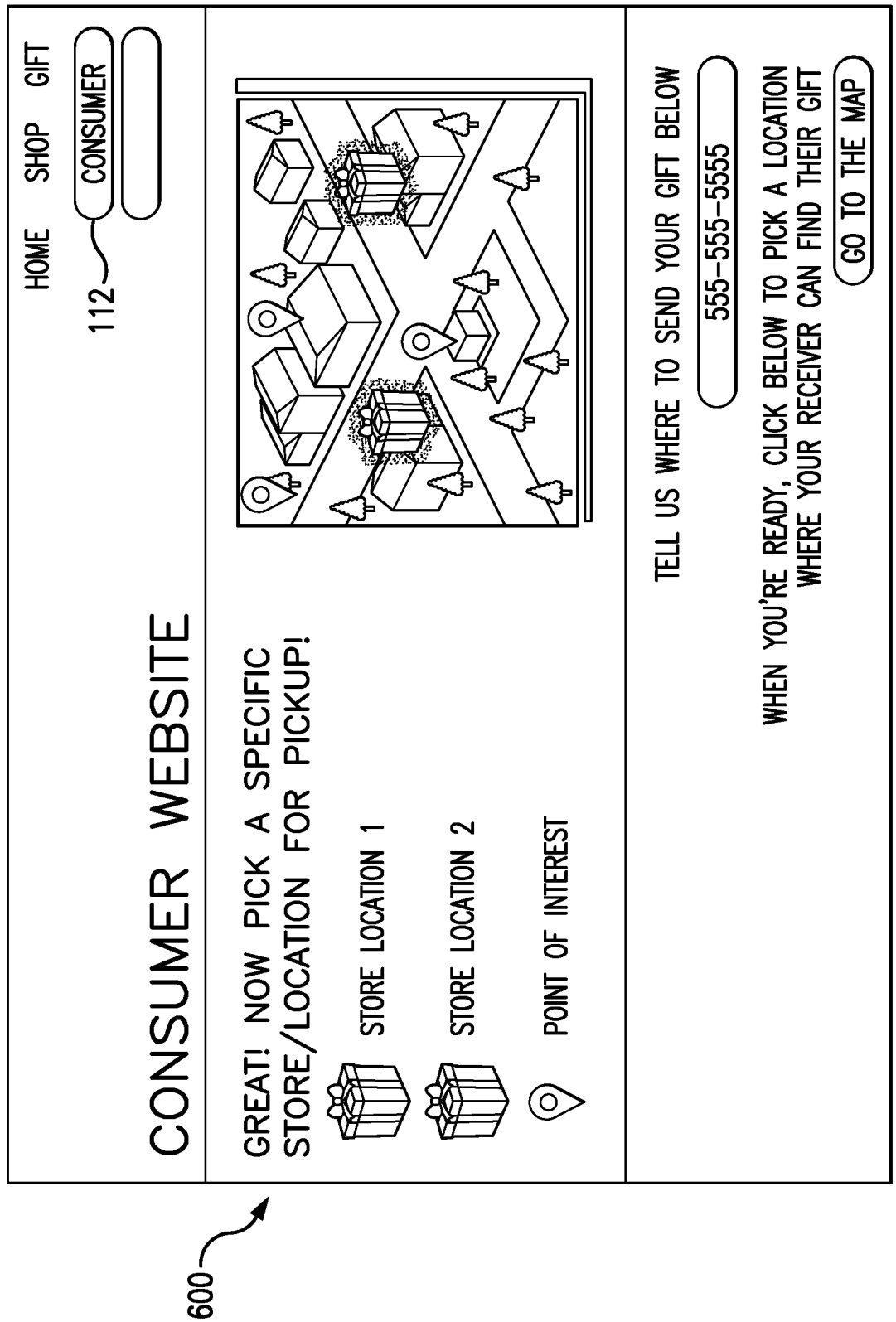
Figure 7:
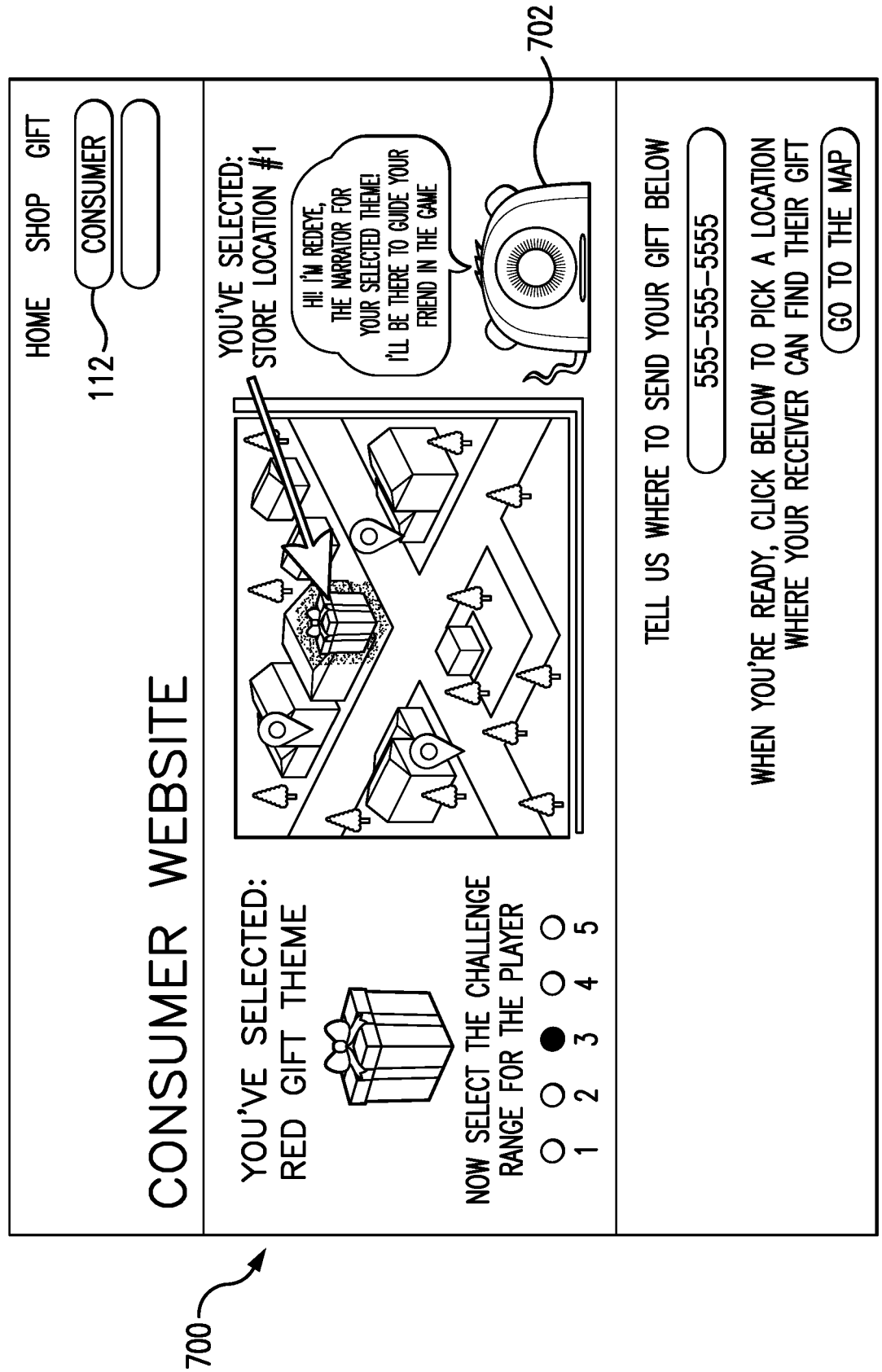
Figure 8:
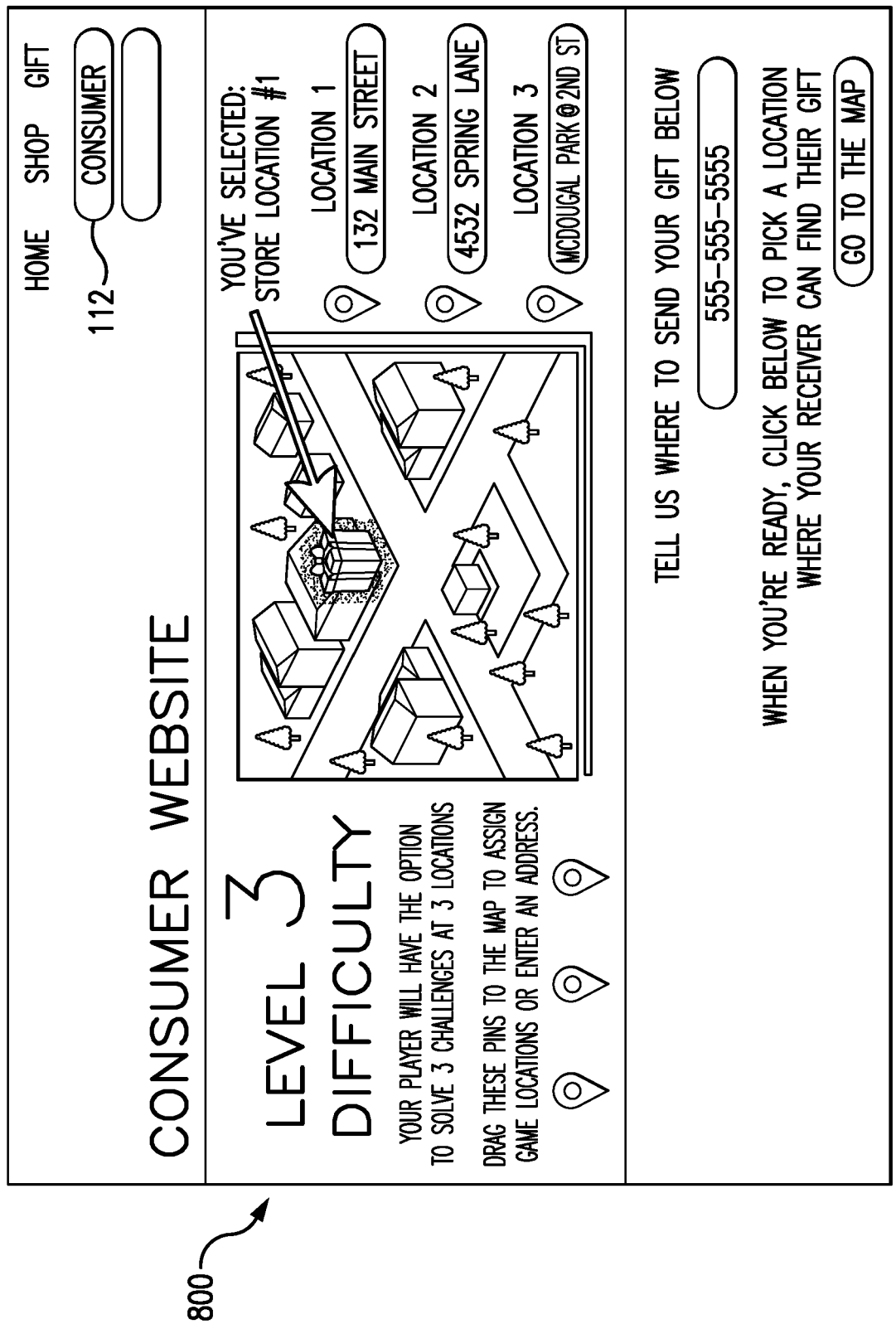

FIGS. 4-9 are exemplary interfaces that may be displayed to a consumer, at a computing device associated with the consumer, as part of establishing an interactive delivery scenario for a product purchased by the consumer, and which are suitable for use in the system of FIG. 1 and/or the method of FIG. 3; and FIGS. 10-17 are exemplary interfaces that may be displayed to a recipient, at a communication device associated with the recipient, as part of an interactive delivery scenario for the recipient to achieve delivery of a product purchased by a consumer, and which are suitable for use in the system of FIG. 1 and/or the method of FIG. 3.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Merchants offer products for sale to consumers, who in turn may purchase the products for themselves, or for others. When purchasing products for other people, the consumers generally purchase the products and either facilitate the delivery of the products to the other people, or have the merchants attend to the delivery of the products (e.g., through carriers, etc.). Uniquely, the systems and methods herein permit the interactive delivery of the products to the desired recipients, whereby the recipients are directed to act, move and/or travel in a specified manner to receive the products. In particular, when a consumer purchases a product, he/she is able to designate the product for interactive delivery. In turn, a gaming engine identifies the purchase, a location of the delivery, the recipient, and parameters of an experience for the recipient to obtain the product. The gaming engine further communicates to the recipient, for example, via a network-based application, and provides instructions and/or clues (broadly, challenges) to aid the recipient in navigating to the location of delivery of the product. The recipient, in turn, interacts with the network-based application, via a communication device, for example, through augmented reality, to navigate to the location of delivery. Once at the location (e.g., the merchant from which the product was purchased, etc.), the recipient is able to claim or otherwise retrieve the product by an indicator provided via the network-based application.

FIG. 1 illustrates an exemplary system 100, in which the one or more aspects of the present disclosure may be implemented. Although the system 100 is presented in one arrangement, other embodiments may include the parts of the system 100 (or other parts) arranged otherwise depending on, for example, implementation of a gaming engine in the system 100; relationships between the gaming engine, merchant(s), and/or a payment network in the system 100; etc.

The system 100 generally includes a merchant 102, an acquirer 104 associated with the merchant 102, a payment network 106, and an issuer 108 configured to issue payment accounts (or other accounts) to consumers, each coupled to (and in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which may provide interconnection between one or more of the merchant 102, the payment network 106, a consumer 112 and/or a recipient 114 (e.g., a communication device 116 associated with the recipient 114), etc.

The merchant 102 is generally provided to offer products (e.g., goods and/or services, etc.) for sale to consumers in the system 100, including the consumer 112. The merchant 102 may offer the products for sale in physical locations or through virtual locations (e.g., through network-based applications (e.g., website, etc.), etc.), as desired.

In some embodiments, the consumer 112 is able to fund transactions with the merchant 102 for one or more of the products via a payment account. More specifically, in the system of FIG. 1, the consumer 112 is associated with such a payment account issued to the consumer 112 by the issuer

108. The consumer 112 is then able to, for example, purchase a product from the merchant 102 using the payment account for himself/herself, or for the recipient 114 (or for other recipients).

In one example, the consumer 112 may initiate a transaction with the merchant 102, for example, to purchase a product by presenting a payment device associated with his/her payment account to the merchant 102, and specifically, to a point-of-sale (POS) terminal at the merchant 102. In turn, the POS terminal reads/receives the payment account credential(s) for the consumer's payment device (or through entry by a sales associate, etc.), and then compiles and transmits an authorization request for the transaction to the acquirer 104 (associated with the merchant 102), along path A, as referenced in FIG. 1. The acquirer 104 then communicates the authorization request with the issuer 108 (associated with the consumer's payment account), through the payment network 106 (e.g., through MasterCard®, VISA®, Discover®, American Express®, etc.), to determine whether the payment account is in good standing and whether there is sufficient funds and/or credit to cover the transaction. In turn, if the transaction is approved, an authorization reply or response (indicating the approval of the transaction) is transmitted back from the issuer 108 to the merchant 102, along path A, thereby permitting the merchant 102 to complete the transaction. The transaction is later cleared and/or settled by and between the merchant 102, the acquirer 104, and the issuer 108 by appropriate agreements. If the transaction is declined, however, the authorization reply (indicating the decline of the transaction) is provided back to the merchant 102, also along path A, thereby permitting the merchant 102 to halt or terminate the transaction.

Transaction data is generated, collected, and stored as part of the above interactions among the merchant 102, the acquirer 104, the payment network 106, the issuer 108, and the consumer 112. The transaction data represents at least a plurality of transactions, for example, authorized transactions, cleared and/or settled transactions, attempted transactions, etc. The transaction data, in this exemplary embodiment, is stored at least by the payment network 106 (e.g., in a data structure associated with the payment network 106, etc.). Additionally, or alternatively, the merchant 102, the acquirer 104 and/or the issuer 108 may store the transaction data, or part thereof, in a data structure, or transaction data may be transmitted between parts of system 100 as used or needed. In general, the transaction data may include, for example, primary account numbers (PANs) for payment accounts involved in the transactions, amounts of the transactions, merchant IDs for merchants involved in the transactions, merchant category codes (MCCs) for merchants involved in the transactions, dates/times of the transactions, products purchased and related descriptions or identifiers, etc. It should be appreciated that more or less information related to transactions, as part of either authorization or clearing and/or settling, may be included in transaction records and stored within the system 100, at the merchant 102, the acquirer 104, the payment network 106 and/or the issuer 108.

In various exemplary embodiments, the consumers (e.g., consumer 112, etc.) involved in the different transactions herein are prompted to agree to legal terms associated with their payment accounts, for example, during enrollment in their accounts, during installation of various network-based applications to their communication devices (such as those referenced herein, etc.), etc. In so doing, the consumers may voluntarily agree, for example, to allow merchants, issuers, payment networks, etc., to use data collected during enrollment and/or collected in connection with processing the transactions, subsequently for one or more of the different purposes described herein.

While one merchant 102, one acquirer 104, one payment network 106, and one issuer 108 are illustrated in FIG. 1, it should be appreciated that any number of these entities (and their associated components) may be included in the system 100, or may be included as a part of systems in other embodiments, consistent with the present disclosure. Likewise, it should be appreciated that the system 100 and/or other system embodiments will generally include multiple consumers and recipients, each associated with a communication device. Further, while the consumer 112 is illustrated as being different from the recipient 114 in the illustrated embodiment, it should be appreciated that in other embodiments the consumer 112 may be the recipient 114 as described herein (e.g., where the consumer 112 requests the experience of the interactive delivery described herein for himself/herself, etc.).

Figure 2:
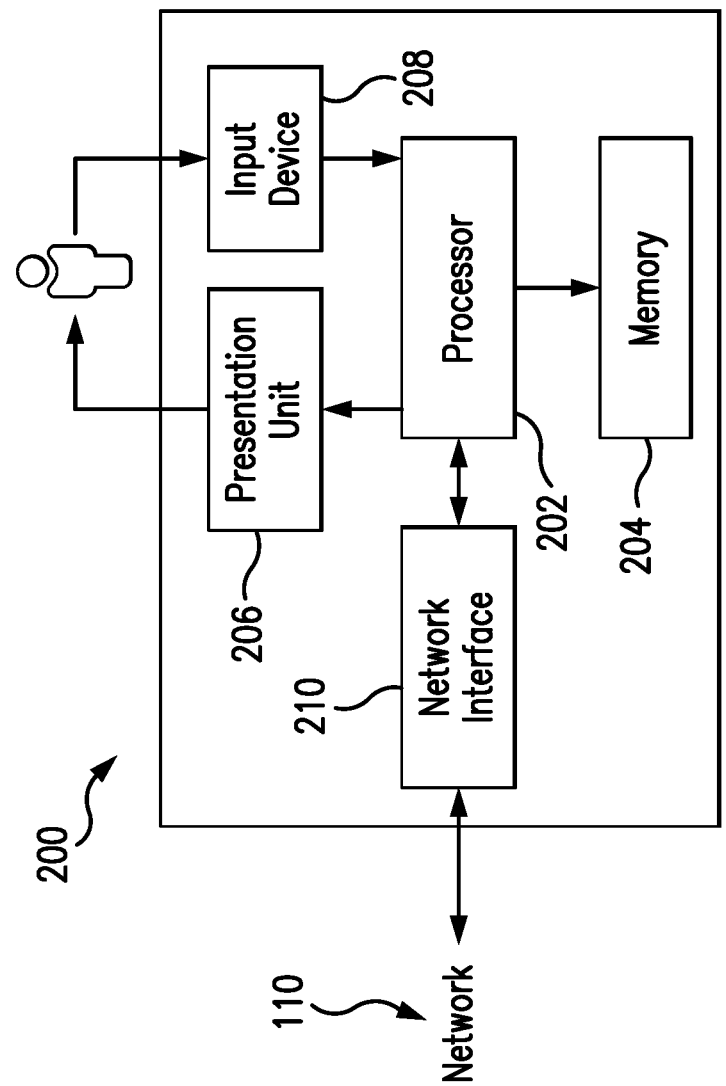
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the acquirer 104, the payment network 106, and the issuer 108 are illustrated as including, or being implemented in, computing device 200, coupled to (and in communication with) the network 110. In addition, the merchant 102 may be considered as including and/or being implemented in at least one computing device consistent with computing device 200. Further, the communication device 116 associated with recipient 114 can also be considered a computing device consistent with computing device 200 for purposes of the description herein. However, with that said, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, themes for interactive delivery experiences, interactive delivery scenarios, intermediate location information, parameters, purchased product records, verification codes, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, such as augmented reality interfaces (e.g., as defined by network-based applications such as applications defined by websites, etc.), visually, for example, to a user of the computing device 200, such as the recipient 114 in the system 100 (e.g., at the communication device 116, etc.), etc. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

In addition, the computing device 200 includes an input device 208 that receives inputs from the user (i.e., user inputs) such as, for example, selections of interactive deliveries for products, as further described below. The input device 208 may include a single input device or multiple input devices. The input device 208 is coupled to (and is in communication with) the processor 202 and may include, for example, one or more of a keyboard, a pointing device, a mouse, a stylus, a barcode scanner, a quick response (QR) code scanner, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

Further, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC) adapter, a Bluetooth adapter, etc.), a mobile network adapter, or other device capable of communicating to one or more different networks, including the network 110. Further, in some exemplary embodiments, the computing device 200 includes the processor 202 and one or more network interfaces incorporated into or with the processor 202. In various embodiments, the computing device 200 includes a global positioning system (GPS) capability whereby the computing device 200 may determine its current geographic location, perform mapping applications, etc. For example, the recipient 114 may utilize the GPS capability of his/her communication device 116 to locate the recipient 114 relative to a product and/or the merchant 102, as described below.

Referring again to FIG. 1, the system 100 includes a gaming engine 118, which is specifically configured, by computer-executable instructions, to perform one or more of the operations described herein. In the illustrated embodiment, the gaming engine 118 is provided as a separate part of the system 100 and in communication with the payment network 106, for example. As such, the gaming engine 118 may be considered a computing device consistent with computing device 200 (and therefore may also be referred to as a gaming engine computing device, etc.). However, as indicated by the dotted line in FIG. 1, the gaming engine 118 may be incorporated, partly or entirely, into the payment network 106 in the illustrated system 100. With that said, it should be appreciated that the gaming engine 118 may be associated with, or incorporated with, other parts of the system 100, in other embodiments, including, for example, one or more of the merchant 102, the acquirer 104, and/or the issuer 108, etc. In addition, while the system 100 is illustrated as including only one gaming engine 118, it should be appreciated that multiple such gaming engines may be included in the system 100 in other embodiments (and associated with and/or incorporated in, partly or entirely, one or more parts of the system 100, whereby the multiple gaming engines may operate, as described herein, in cooperation together, or separately, for use by the consumer 112, the recipient 114, or for multiple of the same).

The system 100 also includes a gaming data structure 120, which is coupled to (and in communication with) the gaming engine 118. The gaming data structure 120 includes multiple gaming scenarios, for different recipients, different skill levels, and different themed scenarios, and various instructions and/or clues associated with intermediate locations, locations for delivery, products, etc., as described herein (e.g., that may be selected at purchase of (or when purchasing) a product, or not, etc.). The gaming data structure 120 may be a standalone part of the system 100, as shown in FIG. 1, or it may be included in memory of the gaming engine 118 (e.g., memory 204, etc.), or it may be included elsewhere in the system 100. Likewise, it should be understood that the gaming data structure 120 may be divided into separate structures, stored at separate parts of the system 100, and accessed from separate locations.

Generally in the system 100, in connection with a purchase of a product by the consumer 112 at the merchant 102 for the recipient 114, the gaming engine 118 is configured to receive a request, form the merchant 102, for example, for an interactive delivery of the product to the recipient 114 (e.g., as indicated by the consumer 112 at purchase of the product, or subsequently, etc.). The request includes, without limitation, a name of and contact information for the recipient 114 (e.g., a device identifier for the recipient's communication device 116 such as a phone number, a media access control address, etc.), a product identifier and/or description of/for the product purchased by the consumer 112, and potentially one or more selections related to the interactive scenario desired by the consumer 112 (e.g., a theme, a demographic of the recipient 114 (e.g., age, gender, etc.), etc.), etc. The gaming engine 118 is configured to then construct an interactive scenario based on the information received in the request for the interactive delivery of the product to the recipient 114 (and potentially based on additional information, such as, for example a location of the recipient 114, etc., received later).

Once the interactive scenario is constructed, in whole or in part, the gaming engine 118 is configured to transmit an invitation to the recipient 114, at the communication device 116, via a network-based application associated therewith (e.g., a gaming application installed at the communication device 116, etc.). The network-based application configures the communication device 116, by computer-executable instructions, to perform one or more of the operations described herein. Specifically, in response to the invitation, the communication device 116 is configured, via the instructions, to invite the recipient 114 to engage in the constructed scenario to retrieve the product, purchased by the consumer 112. The communication device 116, in response to the invitation being accepted by the recipient 114 (at the communication device 116), is configured to notify the gaming engine 118 of such acceptance and/or to provide a current location 122 of the communication device 116 back to the gaming engine 118.

In turn, the gaming engine 118 is configured to cause one or more interfaces, in cooperation with the communication device 116, to be displayed to the recipient 114. The interface(s), for example, may include a segmented route to the location of the purchased product and/or the merchant 102 (e.g., including one or more intermediate locations 124a-c, etc.), or they may reflect a direct route to the purchased product and/or the merchant 102 (as defined by the interactive scenario). It should be appreciated that the gaming engine 118 and/or the communication device 116 are configured to cooperate to modify the interfaces as necessary to reflect the recipient's present location as the recipient 114 travels along the specified route to the purchased product and/or the merchant 102 (e.g., to provide, modify, update, etc. content of the interfaces, etc.). Once within the merchant 102, or within some other threshold (e.g., within 10 feet, 100 feet, etc.) of the product, the gaming engine 118 and/or the communication device 116 are configured to include the purchased product (or a graphical representation of the product) in the interface(s), potentially with a real view background, to permit the recipient 114 to identify and/or travel to the product.

Then, once the product is retrieved (physically by the recipient 114 and/or based on the recipient's view at the interface(s)), the gaming engine 118 and/or the communication device 116 are configured to cause a barcode, QR code, or other insignia or indicator to be displayed at the communication device 116, which may be scanned and/or read by the merchant 102 to release the purchased product to the recipient 114.

FIG. 3 illustrates an exemplary method 300 for use in for facilitating interactive delivery of a product to a recipient, through one or more compiled delivery scenarios. The exemplary method 300 is described as implemented in the gaming engine 118 of the system 100, in conjunction with the recipient's communication device 116. Reference is also made to the computing device 200. However, the methods herein should not be understood to be limited to the system 100 or the computing device 200, as the methods may be implemented in other systems and/or computing device. Likewise, the systems and the computing devices herein should not be understood to be limited to the exemplary method 300.

In the illustrated method 300, as part of a shopping experience by the consumer 112 at the merchant 102, or otherwise, the consumer 112 interacts with the merchant 102 to purchase a product, at 302, for example, via a network-based application (e.g., via a website provided by the merchant 102, etc.), or in-person. The purchase is funded, by the consumer 112, via a payment account transaction in which the consumer 112 uses the payment account issued by the issuer 108 (as described above in the system 100, in connection with path A illustrated FIG. 1). In connection therewith, the consumer 112 enters/provides his/her name and billing information sufficient to initiate the transaction. In addition, the consumer 112 is provided an option to enter a shipping address, to which the product is to be delivered (as is conventional), or further to select an interactive delivery option for the product. In this example, the consumer 112 selects, at 304, the interactive delivery option for the product (for participation by the recipient 114).

Thereafter, the merchant 102 facilitates interaction between the consumer 112 and the gaming engine 118, either directly or indirectly. More specifically, in this exemplary embodiment, the merchant's website invokes, at 306, an API associated with the gaming engine 118. Then, through the API, the gaming engine 118 solicits, at 308, one or more parameters from the consumer 112, which are associated with the interactive delivery of the product to the recipient 114. And, at 310, the consumer 112 provides the solicited parameters to the gaming engine 118 (via the API and/or interface), for use in the interactive delivery of the purchased product to the recipient 114 (in this example).

In connection with the interaction between the gaming engine 118 and the consumer 112, the parameters solicited by the gaming engine 118 in connection with providing the interactive delivery of the product may include, for example, the name of the recipient 114, an electronic address (e.g., email address, username, profile name, alias, application identifier, etc.) for the recipient 114, a physical address for the recipient 114, a phone number for the recipient 114, demographics (e.g., age, gender, etc.) for the recipient 114, a location (or vicinity) for the recipient 114, preferences, one or more messages for the recipient 114 (e.g., a birthday greeting, etc.), and/or other suitable information, etc. The parameters may additionally include a skill level associated with the recipient 114, such as, for example, beginner, intermediate, advanced, etc., and a selection and/or entry of a theme (e.g., sci-fi, fairy-tale (e.g., princess, etc.), sports, action adventure, historic, educational, etc.) for the interactive delivery of the product. Further still, the parameters may include options related to selecting intermediate locations (e.g., points of interest, etc.) and/or a pickup location for the product. The number of intermediate locations and/or the particular intermediate locations themselves may be based on (and/or identified based on) the provided skill level associated with the recipient 114 and/or the selected theme (and/or on other parameters received from the consumer 112, or otherwise). In addition, the pickup location is often within the merchant 102 (or any merchant location (e.g., another retail location of the merchant 102 close to the recipient 114, etc.), but may optionally be apart from the merchant 102 and/or the merchant location associated therewith.

In various embodiments, the gaming engine 118 solicits the one or more parameters through one or more interfaces. In connection therewith, FIGS. 4-9 illustrate exemplary interfaces 400-900 through which the gaming engine 118 may solicit parameters, from the consumer 112 (at a computing device (e.g., computing device 200, etc.) associated with and/or accessible to the consumer 112), for use in providing an interactive delivery scenario to the recipient 114 for a product purchased by the consumer 112. It should be appreciated that the interfaces 400-900 are exemplary in nature, and do not limit the scope of the present disclosure.

For example, upon accessing his/her account with the gaming engine 118 (upon logging in, etc.), the gaming engine 118 may initially display interface 400 to the consumer 112 (at the computing device associated with the consumer 112) to allow the consumer 112 to select whether or not he/she wants to provide a theme for the interactive delivery of the product (to the recipient 114). In connection therewith, the interface 400 includes "YES" button 402 to provide such a theme, and "NO" button 404 to skip providing a theme. The interface 400 also includes an option 406 to simply checkout and purchase the product (e.g., from the merchant 102, etc.), for example, without proceeding further with the interactive delivery scenario.

When the consumer 112 selects to provide a theme for the interactive delivery scenario for the recipient 114 (i.e., selects the "YES" button 402 at the interface 400), the gaming engine 118 may then display interface 500 to the consumer 112, through which the consumer 112 can select a particular theme (i.e., one of a red theme 1, a star theme 2, a yellow theme 3, and a blue theme 4), and provide contact information for the recipient 114 (i.e., phone number 555-555-5555). In addition, upon selecting the desired theme (i.e., the red theme 1 in this example), the gaming engine 118 may display interface 600 to the consumer 112 to allow the consumer 112 to select a location at which the product will be available for delivery to the recipient 114 (i.e., either store location 1, store location 2, or an available point of interest). When the consumer 112 selects the desired delivery location (i.e., store location 1 in this example), the gaming engine 118 may then display interface 700 to the consumer 112, whereby the consumer 112 may select a skill level (i.e., a challenge range) for the recipient 114, in connection with implementing the interactive delivery scenario. The interface 700 also includes a narration character 702, associated with the selected red theme 1 in this example that will provide guidance to the recipient 114 in the scenario ultimately generated by the gaming engine 118. And, upon selection of the desired skill level for the recipient 114 (i.e., level "3" in this example, from interface 700), the gaming engine 118 may in turn display interface 800 to the consumer 112, to allow the consumer 112 to select intermediate locations for the interactive delivery (i.e., to select/provide three intermediate locations in this example, for instance, based on the selection of the red theme 1 and/or the skill level "3;" etc.).

Finally in this example, after the consumer 112 provides detail for each of the intermediate locations to be used in the interactive delivery scenario, the gaming engine 118 may display interface 900 to the consumer 112, in which a summary of the interactive delivery is provided for final review. In particular in this example, as shown in the interface 900, the generated interactive delivery scenario includes three levels each associated with a different intermediate location (and each associated with a question (or clue) for finding the next location) (broadly, a challenge). Upon review of the interactive delivery scenario, and when no changes are needed, the consumer 112 may then select a "GO" icon 902 to implement the interactive delivery scenario for the recipient 114.

With reference again to FIG. 3, once the gaming engine 118 has solicited and/or received the one or more parameters from the consume 112, at 308 and 310, the interaction between the consumer 112 and the gaming engine 118 is generally concluded. In various embodiments, however, the gaming engine 118 may transmit a confirmation to the consumer 112 for the interactive delivery, upon ordering and/or at one or more milestones of the interactive delivery, such as, for example, at the beginning, end, intermediate locations, etc.

Figure 9:
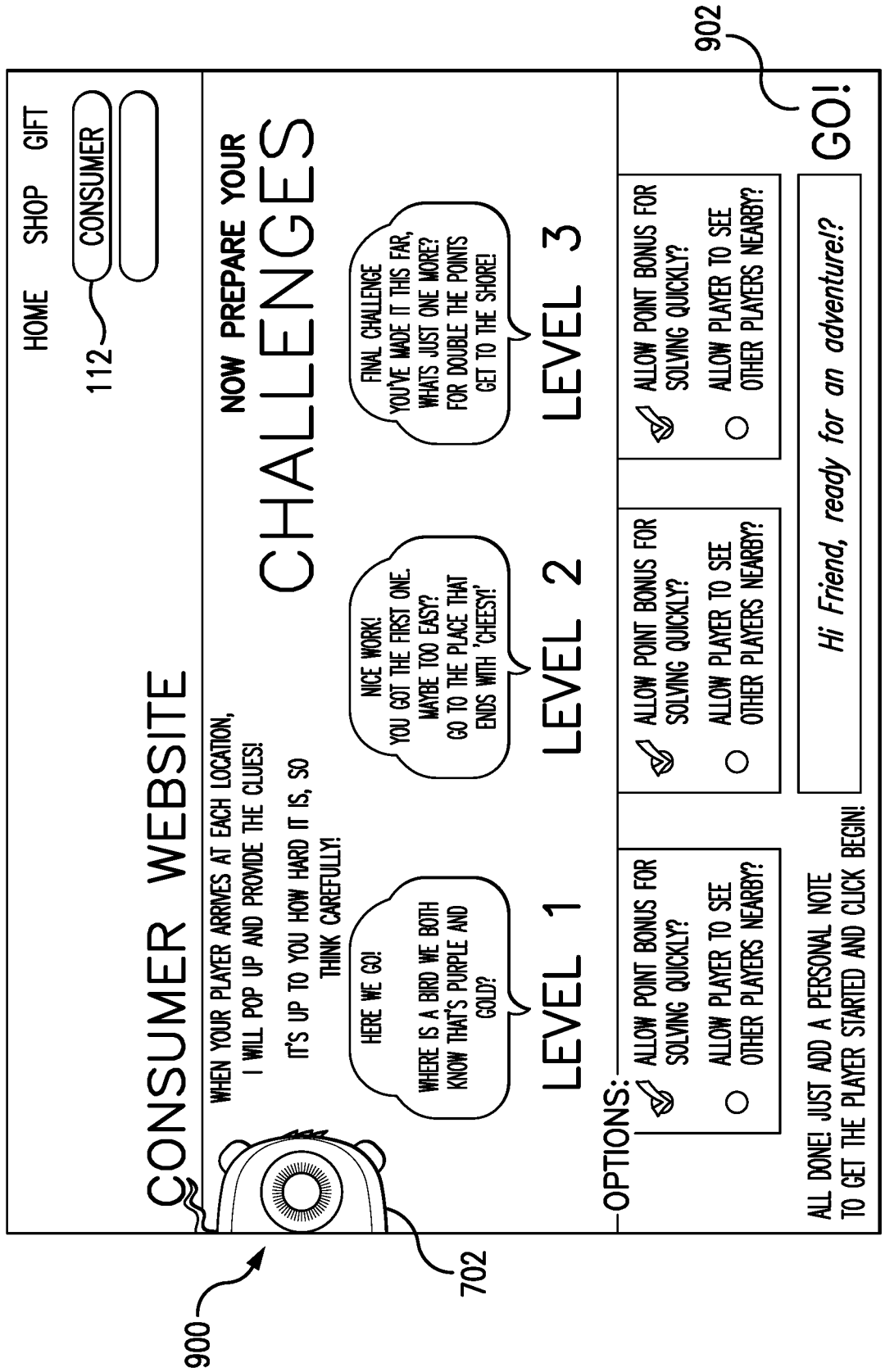
Figure 10:
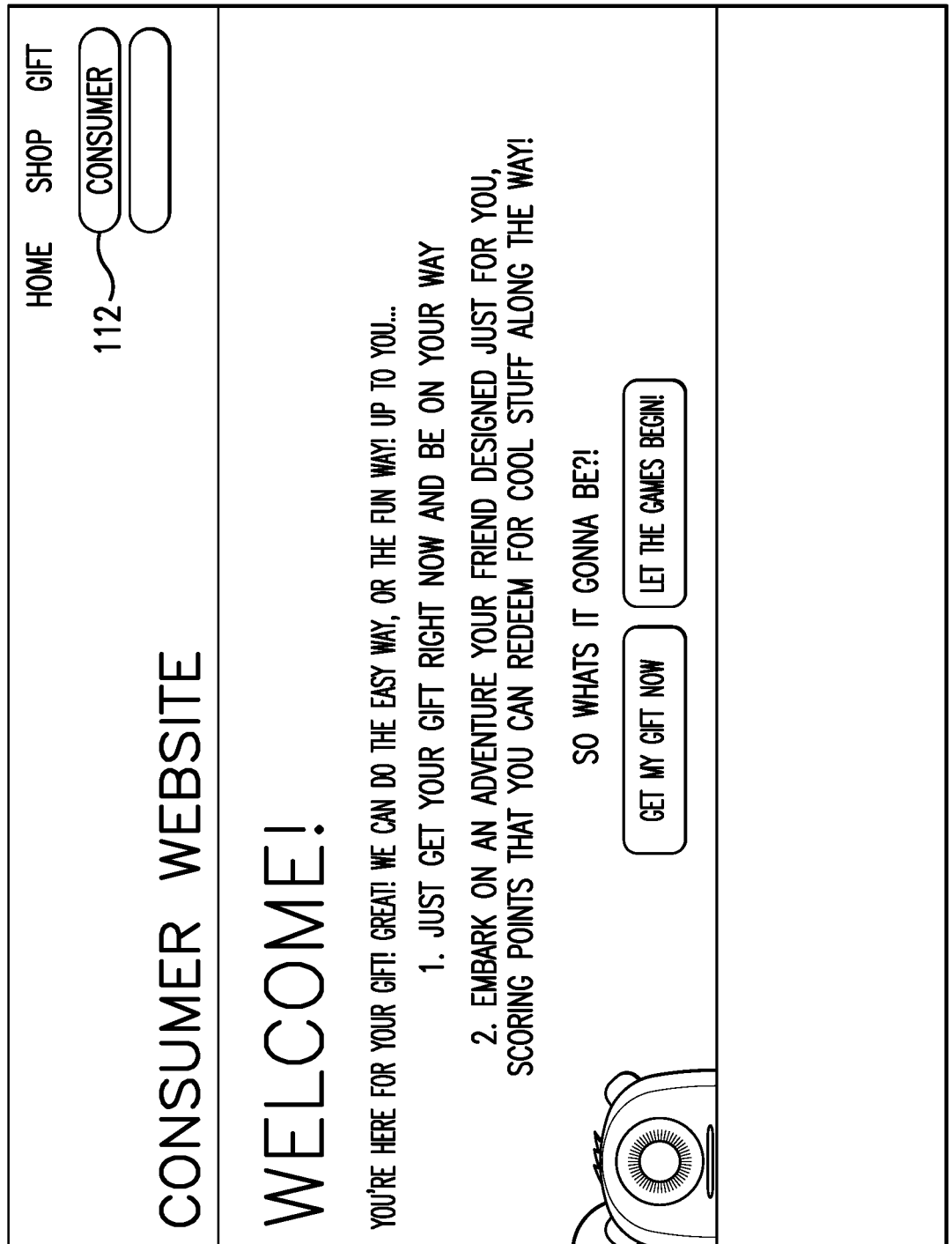
Figure 12:
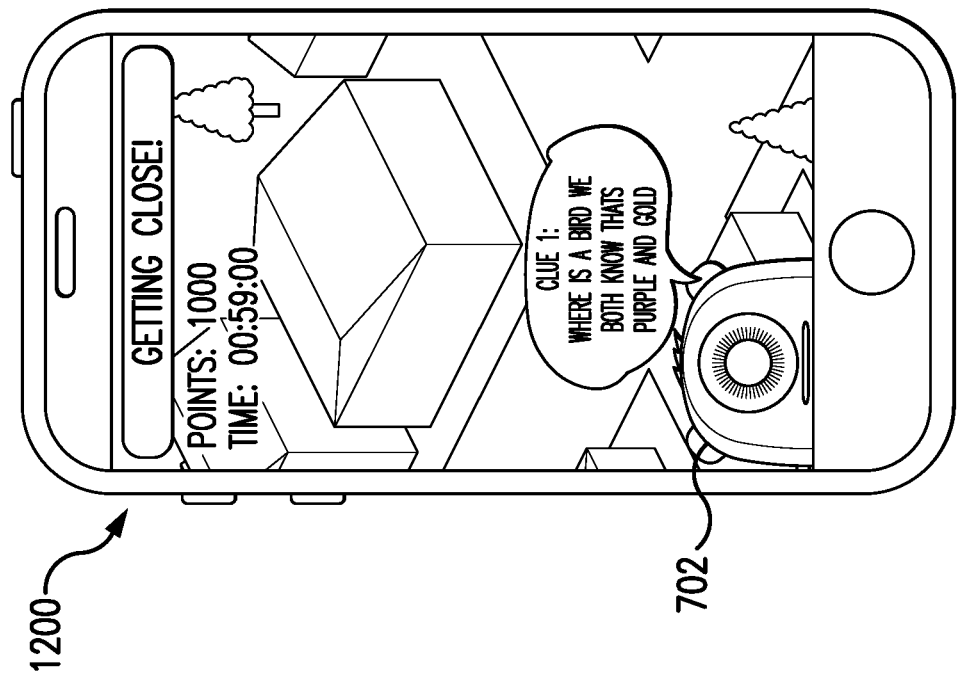
Figure 11:
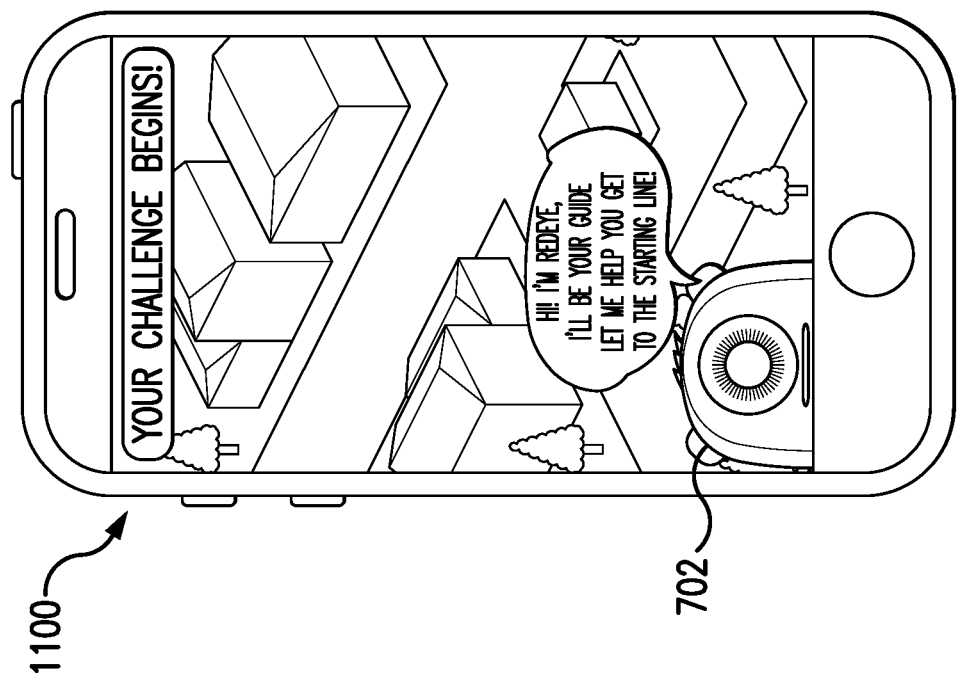
Figure 14:
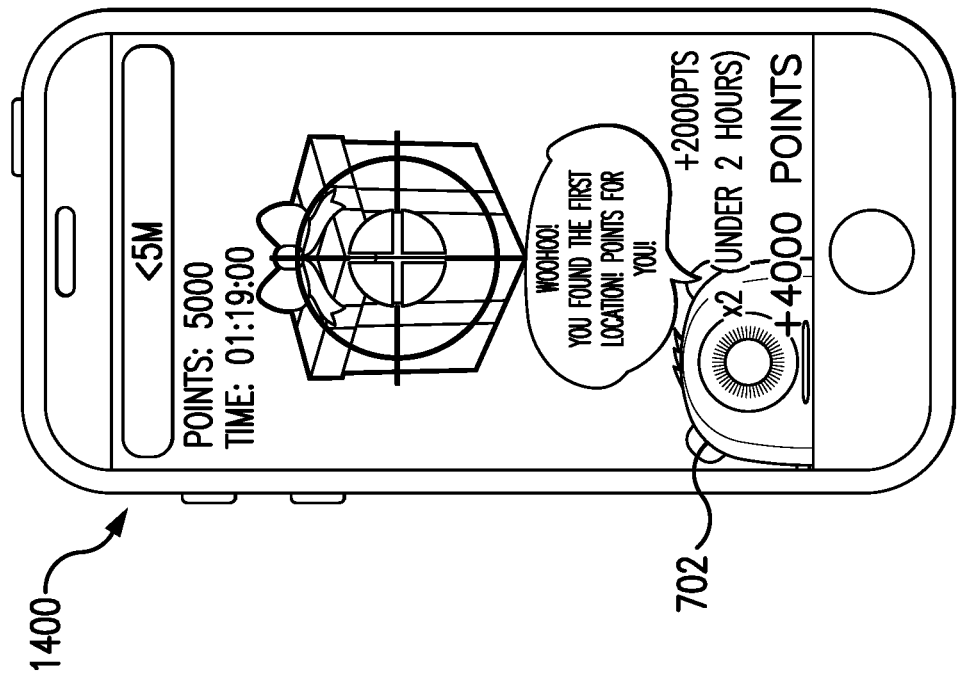
Figure 13:
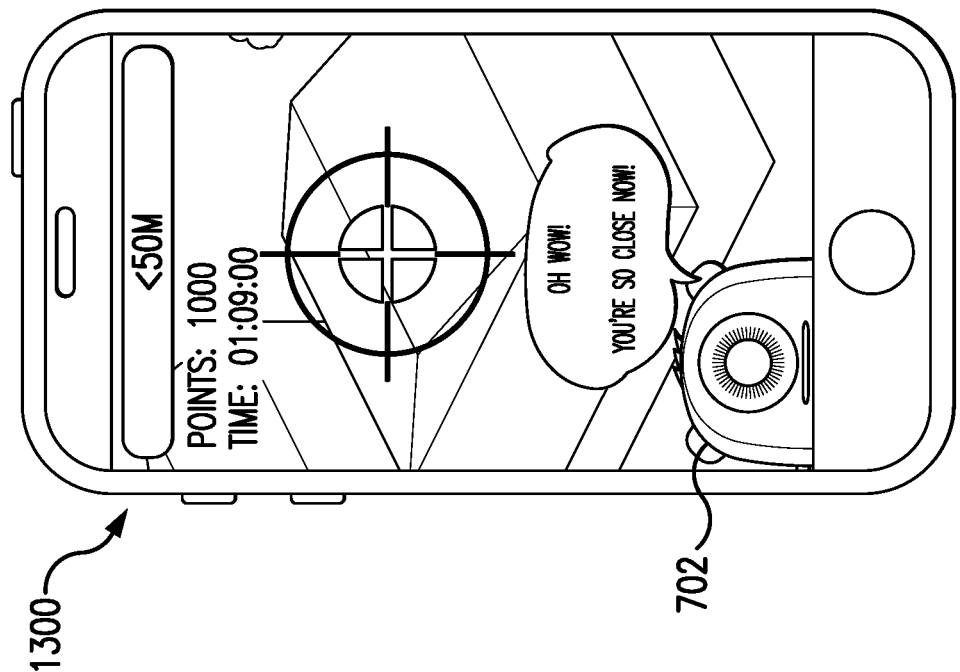
Figure 16:
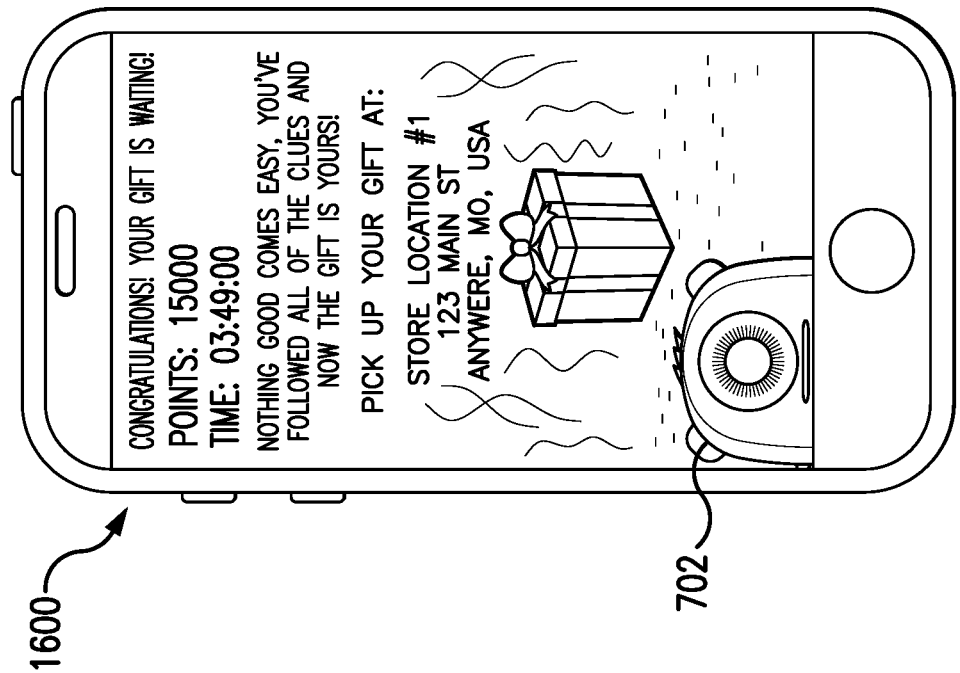
Figure 15:
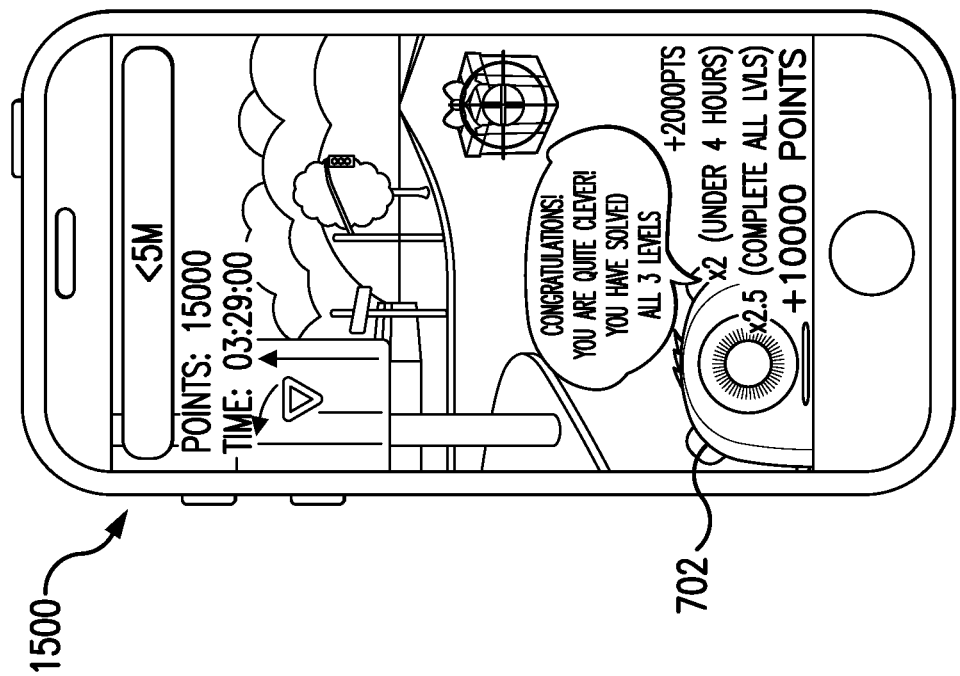
Figure 17:
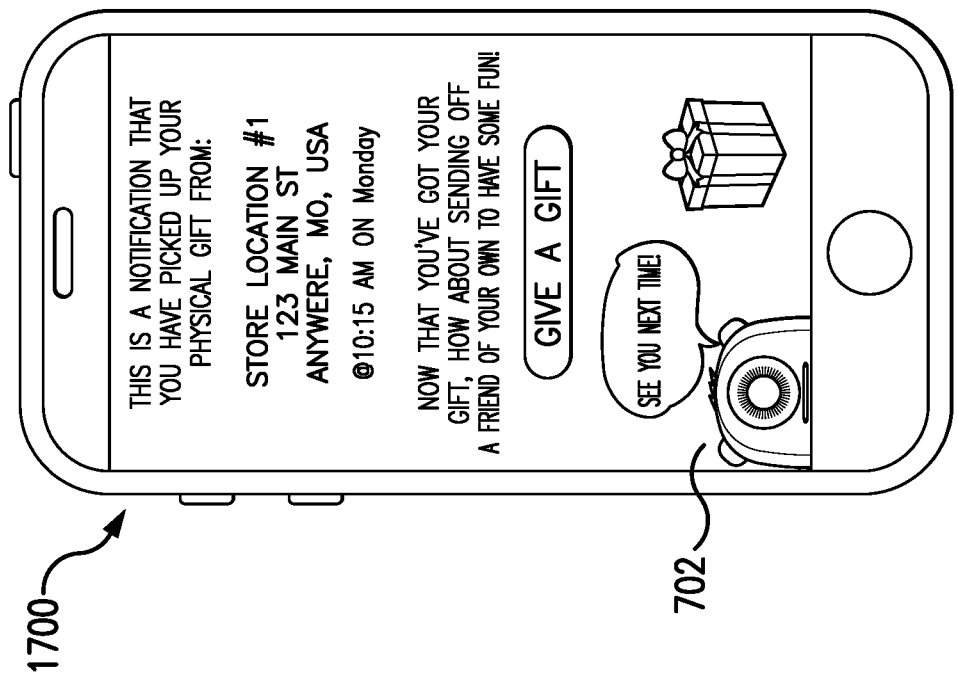

Next in the method 300, the gaming engine 118 compiles, at least partially, at 312, an interactive delivery scenario for the recipient 114. For example, interface 900 of FIG. 9 summarizes the interactive delivery scenario prepared by the gaming engine 118 in the above exemplary scenario, based on the inputs provided by the consumer 112 (e.g., based on the selected red theme 1, the product delivery location of store location 1, the skill level of "3" for the recipient 114, etc.). In various embodiments, the gaming engine 118 may compile the interactive delivery scenario further based on the type of the product purchased, or a category of the product purchased. For example, the gaming engine 118 may provide a different narration character in the scenario for different products or themes (e.g., different than narration character 702, etc.), or different intermediate locations and/or numbers of intermediate locations, or different challenge questions (broadly, challenges) and/or necessary recipient interactions at each intermediate location for the recipient 114, etc. Further still, the gaming engine 118 may compile the interactive delivery scenario to account for bundled experiences, whereby the recipient 114 is able to visit a spa (e.g., as an intermediate location 124*a*, etc.), or visit one or more particular people along the way to pick up the product (e.g., the recipients family or friends at intermediate location 124*b*, etc.), etc.

In one or more embodiments, in connection with compiling the interactive delivery scenario, the gaming engine 118 and/or the merchant 102 may impose a timing restriction on the interactive delivery of the product and more specifically, on the acceptance and/or completion of the interactive delivery scenario. For example, the gaming engine 118 and/or the merchant 102 may require the recipient to pick up the purchased product within one day, two days, one week, etc. of implementation of the interactive delivery scenario.

At the same time or at a different time, the gaming engine 118 transmits, at 314, an invitation to the recipient 114 for the purchased product (and the interactive delivery scenario associated therewith). For example, the gaming engine 118 may transmit an electronic message (e.g., email, SMS text message, application notification, etc.) to the recipient 114 at an account, phone number, etc. indicated in the parameters received from the consumer 114 (e.g., via an SMS message to the recipient 114 at his/her communication device 116 in the above example based on the phone number 555-555-5555 received from the consumer 112 at the interface 500 of FIG. 5, etc.). The invitation may take many forms and may include a variety of information, such as, for example, a message from the consumer 112 (e.g., "Happy Birthday, Katie!! Can you find your present?!"; etc.), descriptions of the interactive delivery scenario, a time restriction of redemption and/or acceptance of the invitation, etc. The invitation, in some embodiments, may further include a redeem instantly option for the recipient 114, which would enable the recipient 114 to avoid and/or bypass the interactive delivery scenario but still obtain/receive the purchased product.

In addition, the invitation will often include a token specific to the product purchased by the consumer 112 and/or specific to the consumer 112, and a link to be selected (or a code (e.g., a QR code, etc.) to be scanned) by the recipient 114 in connection with accepting the invitation (whereupon the token will be entered automatically, or by the recipient 114, at the link). The invitation may further be transmitted to recipient 114 at the communication device 116 as a notification within an installed companion application at the communication device 116. Specifically, for example, the recipient 114 may have installed and registered a companion gaming application for the gaming engine 118, such that the gaming engine 118, based on an email address, username, application ID, etc., is able to transmit a message to the companion application.

Regardless of the manner/form of the invitation, the communication device 116 receives and displays the invitation, at 316, and, if desired, the recipient 114 is able to accept the invitation, at 318, thereby returning the token to the gaming engine 118 (to identify the particular purchased product and/or the consumer 112). In multiple embodiments, when the recipient 114 accepts the invitation, the gaming engine 118 interacts with the communication device 116 to solicit/receive permissions and/or agreement from the recipient 114 (e.g., regarding access to communication device 116, permission to utilize camera input device 208 thereof, permission to utilize GPS network interface 210 thereof, etc.) and, subject to the permission(s) and/or agreement of the recipient 114, to install the companion application and/or other computer-executable instructions at the communication device 116 (if not already installed) to permit the communication device 116 to operate as described herein. In further embodiments, the gaming engine 118 may rely on a web-browser or similar application, installed at the communication device 116, and/or a website and/or API hosted by the gaming engine 118 and interacting therewith, to enable the communication device 116 to operate as described herein (e.g., upon the consumer 112 scanning a code included in the invitation, using his/her communication device 116, whereby the recipient 114 is directed (via his/her communication device 116) to a web-browser or similar application associated with the interactive delivery of the product; etc.).

It should be appreciated that as part of accepting the invitation, at 318, the recipient 114 may be permitted to provide one or more parameters for the interactive delivery scenario. Specifically, for example, rather than having the consumer 112 select a skill level, the recipient 114 may be permitted to provide a skill level. The recipient may also be able to provide a start location, a vicinity of the interactive delivery scenario, and/or other parameters that are usable by the gaming engine 118 in compiling the interactive delivery scenario, at 312, to the recipient's preferences, as well as the consumer's instructions. With that said, as part of accepting the invitation, the location of the communication device 116 (e.g., based on a GPS location of the communication device 116, etc.) may be provided to the gaming engine 118. Finally, as part of accepting the invitation, the recipient 114 may select an option to save the interactive delivery scenario for a later time.

Once the invitation is accepted by the recipient 114 (and/or when the recipient 114 requests launch of the interactive delivery (e.g., at some time after accepting the invitation (e.g., in connection with selection of a previously saved interactive delivery scenario, etc.), etc.)), the gaming engine 118 again compiles (or recompiles, or updates) the interactive delivery scenario, at 312, as necessary or desired, based on the token, the various additional parameters received from the recipient 114, the recipient's location, etc. (e.g., the gaming engine 118 includes additional or different clues for higher skill levels, etc.), and then transmits, at 320, the interactive delivery scenario, in whole or in part, to the recipient 114 at the communication device 116.

Then, upon receipt of the interactive delivery scenario, the communication device 116 displays, at 322, the interactive delivery scenario to the recipient 114, via the presentation device 206, for example. In addition to the interfaces shown at the communication device 116, the scenarios may include narration of the scenario from the location 122 (e.g., the current location of the recipient 114, etc.) to the next intermediate locations 124a-c, or to the final location of the product (i.e., a pick up or a delivery location). The narration may enhance the experience by extending upon the visual theme, and/or may further the scenario by offering clues (or hints) about a next location and/or the purchased product, etc.

As the recipient 114, and therefore the communication device 116, implement the interactive delivery scenario and advance toward an intermediate location (e.g., one of locations 124a-c, etc.), a graphic associated with the location may be displayed within the interface, for example, imposed within a camera view, based on a camera input device 208 of the communication device 116, whereby the recipient 114 is able to view the graphic in an augmented reality view. When the recipient 114 travels or otherwise moves to the location of the graphic, the intermediate location is "achieved" in the interactive delivery scenario, and the gaming engine 118 detects the achievement, at 324 (e.g., the communication device 116 within a defined distance of the next location (e.g., intermediate location 124, etc.) based on a GPS location, etc.). Specifically, for example, when the communication device 116 travels within a defined distance (e.g., 1 foot, 2 feet, 5 feet, 100 feet, etc.) of the intermediate location, as defined by the compiled delivery scenario, the gaming engine 118 (and/or the communication device 116 in some embodiments) may detect the achievement of the intermediate location. In other embodiments, the recipient 114 may be prompted to scan a code (e.g., a QR code, etc.) at the intermediate location to thereby indicate achievement of the intermediate location, or enter, as an input to the communication device 116, a particular characteristic about the location (e.g., take a photograph of the location, provide a text-based entry of a characteristic of the location, etc.), etc.

In turn in the method 300, the gaming engine 118 advances, at 326, the interactive delivery scenario based on the detected location of the communication device 116 and/or the achievement of the intermediate location by the recipient 114. For example, in the system 100 of FIG. 1, when the recipient 114 achieves intermediate location 124b, the gaming engine 118 advances to an interface directing the recipient to intermediate location 124c. Or, when recipient 114 achieves intermediate location 124c, the gaming engine 118 advances to an interface directing the recipient to the final location of the purchased product, that is, the merchant 102 (e.g., a physical location of the merchant 102, a pickup or delivery location for the product (potentially different from a physical location of the merchant 102), etc.). And, once the gaming engine 118 advances the scenario, the communication device 116 displays the advanced delivery scenario to the recipient 114, at 328 for continued pursuit of the purchased product (if it has not yet been obtained). In connection therewith, if the product has not yet been obtained, the method 300 returns and then awaits the next intermediate location to be detected at 324, upon which the above is repeated.

Alternatively, when the gaming engine 118 (and/or the communication device 116 in some embodiments) detects, at 330, that the communication device 116 is within a defined distance of the purchased product and/or the merchant 102, the gaming engine 118 appends an insignia to the interface(s) being displayed to the recipient 114, at 332, representative of the purchased product to the given scenario. The insignia may include any symbol and/or representation of the purchased product such as, for example, a depiction of the product, a depiction of a log associated with the product (or its manufacturer), a virtual character, an actual image of the product, etc. The communication device 116, in turn, displays, at 334, the scenario to the recipient 114 with the insignia appended thereto. Specifically, in this embodiment, the interface(s) representative of the interactive delivery scenario include a camera view from the communication device 116 with the insignia appended at a location associated with the purchased product and/or the merchant 102, thereby providing an augmented reality view to the recipient 114 for locating the purchased product.

Thereafter, as the recipient 114 travels to the location of the insignia, the gaming engine 118 (and/or the communication device 116 in some embodiments) detects, at 336, the recipient's capture of the insignia (e.g., the recipient 114 travels within a defined distance (e.g., 1 foot, 2 feet, 5 feet, 100 feet, etc.) of a location of the insignia, the recipient 114 scans a code associated with the product, the recipient 114 takes a photograph of the product, etc.). Then, once detected, the gaming engine 118 transmits, at 338, a confirmation of the product to the recipient 114, at the communication device 116. The confirmation may be in the form of a message, or link. In response to the confirmation (or a selection of the confirmation by the recipient 114), the communication device 116 displays, at 340, information indicative of the confirmation for the merchant 102. Specifically, for example, when the confirmation includes the link, when the link is selected by the recipient 114, at the communication device 116, it may cause, via the API with the gaming engine 118, or otherwise, a barcode, or QR code, or other computer-readable symbol, or code (e.g., sequence of letters and/or numbers, etc.), etc. to be displayed to the recipient 114 at the communication device 116. The merchant 102, in turn, then reads and/or captures the information indicative of the confirmation (e.g., scans the QR code, etc.), at 342. The merchant 102 is then able to enter a store identifier associated with the merchant 102 and to further verify, at 344, the confirmation code, for example, with the gaming engine 118 (or based on information included in memory (e.g., the memory 204, etc.), etc.). In response, the gaming engine 118 verifies the confirmation code, at 344, and stores the store identifier in memory (e.g., the memory 204, etc.), as a record of fulfillment of the purchased product and/or a merchant location at which the product was provided. Therefrom, the merchant 102 is permitted to release, at 346, the purchased product to the recipient 114.

FIGS. 10-17 illustrate exemplary interfaces 1000-1700 through which the gaming engine 118 may provide the interactive delivery scenario for the product purchased by the consumer 112 (and defined by the consumer 112 via the interfaces 400-900 of FIGS. 4-9 described above), to the recipient 114 (e.g., at the recipient's communication device 116, etc.). Again, it should be appreciated that the interfaces 1000-1700 are exemplary in nature, and do not limit the scope of the present disclosure.

For example, upon the recipient 114 accepting an invitation from the gaming engine 118 regarding the interactive delivery option for the product (or upon request by the recipient 114 to launch the interactive delivery scenario), the gaming engine 118 may initially display interface 1000 to the recipient 114 (at his/her communication device 116), through which the recipient 114 has the options to initiate the interactive delivery scenario (via the button "Let The Games Begin"), or proceed to obtaining the product (via the button "Get My Gift Now"). When the recipient 114 selects to initiate the interactive delivery scenario (at the interface 1000), the gaming engine may 118 then sequentially display interface 1100 to the recipient 114, generally introducing the scenario (by the narration character 702), and interface 1200, providing a first clue associated with a first intermediate location of the scenario. The illustrated interface 1200 also includes an indicator of points achieved by the recipient 114 through the interactive delivery scenario, and a timer indicating duration since the scenario initiated. As the recipient 114 moves closer to the first intermediate location, the gaming engine 118 displays interface 1300 to the recipient 114, updating his/her progress. And, when the recipient 114 achieves the first intermediate location, the gaming engine 118 displays interface 1400 indicating that the recipient 114 has successfully reached the first intermediate location. In connection therewith, the gaming engine 118 also awards points to the recipient 114 for successfully completing this part of the interactive delivery scenario. This repeats for each of the second and third intermediate locations associated with the interactive delivery scenario.

Then in this example, when the recipient 114 achieves each of the three intermediate locations, the gaming engine 118 displays interface 1500 to the recipient 114, confirming that all three of the intermediate locations are achieved (and includes an image of the present (e.g., as an insignia representative of the product, etc.) appended thereto). The gaming engine 118 then displays interface 1600 to the recipient 114, providing the ultimate location of the product (along with the image of the present appended thereto). Finally, when the recipient obtains the product, the gaming engine 118 may display interface 1700 to the recipient 114 confirming the delivery. With that said, the points obtained by the recipient in connection with performing the interactive delivery scenario may be used to purchase products from the merchant 102, or may be used as a basis of comparison with other recipients also participating in interactive delivery scenarios. In addition, in some embodiments, when the recipient 114 achieves each of the three intermediate locations (or other number of intermediate locations), the gaming engine 118 may display interface 1500 to the recipient 114, again confirming that all of the intermediate locations are achieved, but with an actual image of the product (as an insignia) that is to be delivered to the recipient (instead of a generic insignia). The actual image may then also be displayed to the recipient at the interface 1600 and/or the interface 1700.

In view of the above, the systems and methods herein permit the interactive delivery of products to desired recipients, whereby the recipients are directed to act, move and/or travel in a specified manner to receive the products. In so doing, consumer traffic at merchants implementing such delivery options may increase (as recipient individuals are additionally directed to locations of the merchants to take delivery of products that are purchased by the consumers). In addition, the interactive delivery options may build alliance to the merchants, as consumers may desire to provide such added gamification features to recipients in connection with products purchased by the consumers for the recipients (and beyond the mere acceptance of the products by the recipients). What's more, the interactive delivery scenarios may be customized to the particular recipients, to further enhance and tailor the experiences.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) soliciting at least one parameter associated with a product, the product subject to purchase by a consumer; (b) transmitting an invitation to an interactive delivery of the product to a recipient; (c) compiling a scenario for the interactive delivery of the product based on the at least one parameter; (d) in response to acceptance of the invitation, transmitting the interactive delivery scenario to a communication device associated with the recipient, the interactive delivery scenario including at least one location; (e) appending a product insignia to the interactive delivery scenario in response to the communication device traveling to the at least one location; and (f) transmitting a confirmation for the product when the communication device travels to a delivery location associated with the product insignia, whereby the recipient is permitted to receive the product based on the confirmation.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for facilitating interactive delivery of a product to a recipient, the method comprising:

soliciting, by at least one computing device, at least one parameter associated with a product, the product subject to purchase by a consumer, the at least one parameter indicative of a feature of an interactive delivery scenario for directing a recipient to the product;

transmitting, by the at least one computing device, an invitation to an interactive delivery of the product to the recipient via the interactive delivery scenario;

compiling the interactive delivery scenario for the product based on the at least one parameter;

in response to acceptance of the invitation, transmitting, by the at least one computing device, the interactive delivery scenario to a communication device associated with the recipient, the interactive delivery scenario including multiple locations for the recipient to travel to in order to receive the product, the multiple locations including at least one intermediate location and a delivery location for the recipient to receive the product, the delivery location different than the at least one intermediate location;

detecting the communication device within a defined distance of the at least one intermediate location;

advancing, by the at least one computing device, the interactive delivery scenario from the at least one intermediate location to the delivery location in response to the detection of the communication device within the defined distance of the at least one intermediate location, whereby the advance of the interactive delivery scenario is displayed to the recipient in an augmented reality view at the communication device;

appending a product insignia to the interactive delivery scenario, in the augmented reality view, at the delivery location;

detecting the communication device within a defined distance of the delivery location; and transmitting, by the at least one computing device, a confirmation for the product to the communication device in response to the detection of the communication device at the delivery location associated with the product insignia, wherein the confirmation is a permission for the recipient to receive the product.

2. The computer-implemented method of claim 1, wherein transmitting the invitation includes transmitting one of an email message and an SMS message to the recipient; and wherein the invitation includes a token specific to the product.

3. The computer-implemented method of claim 1, wherein the feature of the interactive delivery scenario incudes a skill level associated with the recipient, a message for the recipient, and/or a theme selected by the consumer.

4. The computer-implemented method of claim 3, wherein compiling the scenario for the interactive delivery of the product is further based on a location associated with the communication device.

5. The computer-implemented method of claim 1, wherein compiling the scenario for the interactive delivery of the product includes generating at least one challenge for the recipient associated with identifying the at least one intermediate location, whereby the recipient is required to perform the challenge in order to identify and/or achieve the at least one intermediate location.

6. The computer-implemented method of claim 5, wherein the at least one intermediate location includes multiple intermediate locations; and wherein generating the at least one challenge for the recipient includes identifying the multiple intermediate locations based on the at least one parameter associated with the product.

7. The computer-implemented method of claim 6, wherein the at least one parameter associated with the product includes a skill level of the recipient and/or a theme for the interactive delivery scenario.

8. The computer-implemented method of claim 1, wherein transmitting the interactive delivery scenario to a communication device includes:

transmitting a first segment of the interactive delivery scenario, the first segment including the at least one intermediate location; and after detecting the communication device at the at least one intermediate location, transmitting a second segment of the interactive delivery scenario, the second segment of the interactive delivery scenario including the delivery location.

9. The computer-implemented method of claim 1, wherein the confirmation is associated with a confirmation code; and wherein the method further comprises verifying the confirmation code at the merchant involved in the purchase by the consumer.

10. A system for facilitating interactive delivery of a product to a recipient, the system comprising a gaming engine computing device configured to:

solicit from a consumer, in connection with a purchase of a product by the consumer at a merchant, at least one parameter associated with a recipient of the product, the at least one parameter indicative of a feature of an interactive delivery scenario for the product;

compile the interactive delivery scenario for the product based on the at least one parameter, the interactive delivery scenario including multiple locations for the recipient to travel to in order to receive the product, the multiple locations including a delivery location for the recipient to receive the product and at least one intermediate location, the delivery location different than the at least one intermediate location;

transmit the interactive delivery scenario to a communication device associated with the recipient;

display an interface to the recipient, at the communication device, comprising a challenge for the recipient to identify the at least one intermediate location;

identify when the recipient travels to the at least one intermediate location and, in response, display another interface to the recipient, at the communication device, comprising a challenge for the recipient to identify the delivery location associated with the product; and identify when the recipient travels to the delivery location and, in response, transmit a confirmation for the product to the recipient, at the communication device, wherein the confirmation is a permission for the recipient to receive the product from the merchant.

11. The system of claim 10, wherein the gaming engine computing device is configured, in connection with compiling the scenario for the interactive delivery of the product, to generate the challenge for the recipient to identify the at least one intermediate location based on the at least one parameter, and to generate the challenge for the recipient to identify the delivery location associated with the product based on the at least one parameter; and wherein the challenge for the recipient to identify the at least one intermediate location is different from the challenge for the recipient to identify the delivery location associated with the product.

12. The system of claim 11, wherein the at least one intermediate location includes multiple intermediate locations; and wherein the gaming engine computing device is configured, in connection with compiling the scenario for the interactive delivery of the product, to identify the multiple locations based on the at least one parameter.

13. The system of claim 12, wherein the feature of the interactive delivery scenario includes a skill level of the recipient and/or a theme for the interactive delivery scenario.

14. The system of claim 10, wherein the gaming engine computing device is configured, in connection with identifying when the recipient achieves the at least one intermediate location, to identify when the communication device associated with the recipient is within a defined distance of the at least one intermediate location.

15. The system of claim 14, wherein content of the another interface is based on a location of the communication device associated with the recipient, upon achieving the at least one intermediate location.

16. The system of claim 10, wherein the gaming engine computing device is further configured to transmit an invitation to the recipient, at the communication device associated with the recipient, for the interactive delivery of the product based on the at least one parameter solicited from the consumer; and wherein the invitation includes a token specific to the product.

17. A non-transitory computer-readable storage media comprising executable instructions for facilitating interactive delivery of a product to a recipient, which when executed by at least one processor, cause the at least one processor to:

solicit, from a consumer, at least one parameter associated with a product, the product being subject to purchase by the consumer, the at least one parameter indicative of a feature of an interactive delivery scenario of the product;

transmit an invitation to a recipient, as identified by the consumer, for an interactive delivery of the product to the recipient;

compile the interactive delivery scenario of the product based on the at least one parameter;

in response to acceptance of the invitation, transmit the interactive delivery scenario to a communication device associated with the recipient, the interactive delivery scenario including multiple locations for the recipient to travel to in order to receive the product, the multiple locations including at least one intermediate location and a delivery location for the recipient to receive the product, the delivery location different than the at least one intermediate location;

detect the communication device within a defined distance of the at least one intermediate location; and advance the interactive delivery scenario to the delivery location in response to the detection of the communication device at the at least one intermediate location, whereby the advance of the interactive delivery scenario is displayed to the recipient at the communication device.

18. The non-transitory computer-readable storage media of claim 17, wherein the executable instructions, when executed by the at least one processor, further cause the at least one processor to transmit a confirmation for the product to the communication device when the communication device is within a defined distance of the delivery location, whereby the recipient is able to receive the product based on the confirmation.

19. The non-transitory computer-readable storage media of claim 17, wherein the executable instructions, when executed by the at least one processor in connection with compiling the scenario for the interactive delivery of the product, cause the at least one processor to:

identify the at least one intermediate location based on the at least one parameter associated with the product; and generate at least one challenge for the recipient associated with identifying the at least one intermediate location, whereby the recipient is required to perform the challenge in order to identify and/or achieve the at least one intermediate location.

* * * * *